(12) United States Patent
Heimerikx

(10) Patent No.: US 11,167,851 B2
(45) Date of Patent: Nov. 9, 2021

(54) FLIGHT INFORMATION SYSTEM AND METHOD

(71) Applicant: MI Group B.V., s-Gravenhage (NL)

(72) Inventor: Job Daniel Maria Heimerikx, Hoofddorp (NL)

(73) Assignee: MI Group B.V., DT's-Gravenhage (NL)

( * ) Notice: Subject to any disclaimer, the term of this patent is extended or adjusted under 35 U.S.C. 154(b) by 0 days.

(21) Appl. No.: 16/091,817

(22) PCT Filed: Apr. 5, 2017

(86) PCT No.: PCT/NL2017/050216
§ 371 (c)(1),
(2) Date: Oct. 5, 2018

(87) PCT Pub. No.: WO2017/192030
PCT Pub. Date: Nov. 9, 2017

(65) Prior Publication Data
US 2019/0161192 A1  May 30, 2019

(30) Foreign Application Priority Data

Apr. 5, 2016  (NL) .................................. 2016556

(51) Int. Cl.
*G08B 21/00* (2006.01)
*B64D 11/00* (2006.01)
(Continued)

(52) U.S. Cl.
CPC ..... *B64D 11/0015* (2013.01); *G06Q 30/0281* (2013.01); *G06Q 50/30* (2013.01);
(Continued)

(58) Field of Classification Search
CPC ........... B64D 11/0015; G60Q 30/0281; H04N 21/2146
See application file for complete search history.

(56) References Cited

U.S. PATENT DOCUMENTS 6,819,766 B1 * 11/2004 Weidong ................. H04L 9/088
380/277
8,146,141 B1 * 3/2012 Grandcolas ........... H04L 9/3226
726/5

(Continued)

FOREIGN PATENT DOCUMENTS

GB     2514393 A     11/2014
WO  2013185886 A1  12/2013

*Primary Examiner* — Phung Nguyen
(74) *Attorney, Agent, or Firm* — The Webb Law Firm

(57) ABSTRACT

The present invention relates to an aircraft information system and a method for providing passenger information, such as flight information or entertainment information, to the passengers in an aircraft by making use of communication between at least one passenger device and the aircraft information system, the aircraft information system comprising: —storage means for storing information thereon, —one or more processing units for performing information processing, —energy providing means for providing energy to the aircraft information system, —data communication means, such as wireless communication means, for communication with the at least one passenger device, —wherein the aircraft information system is configured as autonomous unit for autonomous functioning, such as independently of further systems in the aircraft, and wherein the aircraft information system comprises: —receiving means for receiving source information relating to the aircraft for forming on the basis of the source information respective passenger information for transmission to the at least one passenger device.

26 Claims, 2 Drawing Sheets

(51) Int. Cl.
  *H04N 21/214* (2011.01)
  *G06Q 50/30* (2012.01)
  *G08G 5/00* (2006.01)
  *G06Q 30/02* (2012.01)
(52) U.S. Cl.
  CPC ......... *G08G 5/0021* (2013.01); *G08G 5/0052* (2013.01); *H04N 21/2146* (2013.01)

(56) References Cited

U.S. PATENT DOCUMENTS

| | | | |
|---|---|---|---|
| 9,964,638 B2 | 5/2018 | Wende | |
| 2004/0143738 A1* | 7/2004 | Savage | G06F 21/31 713/168 |
| 2006/0107295 A1* | 5/2006 | Margis | H04N 21/8126 725/81 |
| 2007/0271009 A1* | 11/2007 | Conroy, Jr. | B64D 13/00 701/10 |
| 2009/0081947 A1 | 3/2009 | Margis | |
| 2009/0282469 A1* | 11/2009 | Lynch | H04B 7/18506 726/11 |
| 2011/0057830 A1* | 3/2011 | Sampigethaya | G01S 5/0072 342/36 |
| 2011/0189943 A1* | 8/2011 | Ilarregui | H04B 7/15592 455/7 |
| 2012/0232782 A1 | 9/2012 | Sterkel et al. | |
| 2012/0232791 A1* | 9/2012 | Sterkel | H04H 20/62 701/454 |
| 2012/0246487 A1* | 9/2012 | Gu | G06F 21/51 713/190 |
| 2014/0282727 A1* | 9/2014 | Keen | H04N 21/4126 725/37 |
| 2014/0282747 A1 | 9/2014 | Richman et al. | |
| 2016/0083091 A1* | 3/2016 | Elias | H04H 20/62 455/3.06 |
| 2016/0133137 A1 | 5/2016 | Rencher et al. | |
| 2019/0074982 A1* | 3/2019 | Hughes | H04L 9/0863 |

* cited by examiner

FLIGHT INFORMATION SYSTEM AND METHOD

CROSS-REFERENCE TO RELATED APPLICATIONS

This application is the United States national phase of International Application No. PCT/NL2017/050216 filed Apr. 5, 2017, and claims priority to Dutch Patent Application No. 2016556 filed Apr. 5, 2016, the disclosures of which are hereby incorporated in their entirety by reference.

BACKGROUND OF THE INVENTION

The present invention relates to an aircraft information system for providing information, such as flight information or entertainment information, to the passengers in an aircraft by making use of communication between a passenger device and the aircraft information system. A passenger device is here a device used by the passenger to consume the information. Such a device can be provided by cabin crew, but can also be taken on board by the passenger him/herself. Examples hereof are mobile phones, tablets or laptops with screens on which applications or web browsers can show the information.

Information systems exist per se, such as entertainment systems for use on aircraft. Such systems are limited in the types of information they can provide to the passenger. The present invention has for its object to provide new, unknown types of information to the passenger in new and inventive manner.

SUMMARY OF THE INVENTION

The present invention provides for this purpose an aircraft information system for providing passenger information, such as flight information or entertainment information, to the passengers in an aircraft by making use of communication between at least one passenger device and the aircraft information system, the aircraft information system comprising:
  storage means for storing information thereon,
  one or more processing units for performing information processing,
  energy providing means for providing energy to the aircraft information system,
  data communication means, such as wireless communication means, for communication with the at least one passenger device,
  wherein the aircraft information system is configured as autonomous unit for autonomous functioning, such as independently of further systems in the aircraft, and wherein the aircraft information system comprises:
  receiving means for receiving source information relating to the aircraft for forming on the basis of the source information respective passenger information for transmission to the at least one passenger device.

An advantage of a system according to the present invention is that, on the basis of the source information, aircraft-specific information can be formed for presentation thereof to passengers. It hereby becomes possible for instance to have the aircraft information system determine autonomously in which aeroplane it is present and/or under which flight number it is flying. It becomes possible on the basis hereof to present information relating to the aircraft and/or the flight number to the passenger. It is for instance possible here to present external characteristics of the aircraft, such as colours, flags or symbols, to the passenger.

According to a first preferred embodiment, the receiving means are configured for this purpose to receive ADS signals, such as ADS-B, ADS-A or ADS-C signals. ADS-B signals in particular are widely used and are specifically suitable for application in the present invention.

The aircraft information system more preferably comprises means, such as program code means executable on a respective processing unit, for determining which ADS-B signals are related to the aircraft. This provides for a practical implementation in determining in relation to which aircraft and/or flight number the aircraft information system is currently functioning.

The aircraft information system is more preferably provided with sensors for detecting ambient variables, for providing measurement data such as movement by means of an accelerometer, air pressure by means of a pressure sensor, preferably for measuring an absolute air pressure, more preferably for measuring changes in air pressure. Such ambient variables can be applied in different preferred embodiments according to the present invention. Advantageous is that, on the basis of the accelerometer and air pressure gauge, determinations can be made relating to the different stages of a flight, such as detection of standstill at the gate, taxiing, take-off, flying at cruise speed, approach to the airport and landing. By making use of the characteristic measurements associated with and determinable at these stages it is for instance determined that the transmission function of a mobile telecommunication module such as GSM, 3G, 4G has to be switched off.

The aircraft information system is more preferably provided with a receiver for mobile telecommunication, such as GSM, 3G, 4G, preferably a transceiver therefor. Such a receiver is important in passive determination of the presence of such signals, since during the flight, and particularly during landing, the transmission of such signals is considered undesirable.

The aircraft information system more preferably comprises means for determining the presence of the aircraft on the ground, preferably relating to a landing event, more preferably comprising means for determining a departure and/or ending of the presence of an aircraft on the ground, more preferably relating to a take-off event. During presence on the ground the use of data communication via mobile data communication is advantageous in providing a connection between the aircraft information system and further information sources, update systems and the like. The wireless communication means available for communication between different units of the aircraft information system and/or the passenger devices can also be applied for this purpose.

Individual units of the aircraft information system are more preferably housed in a holder, such as a closed holder, such as a case, canister or box. It hereby becomes possible to scale the system in advantageous manner. When for instance a unit of the aircraft information system is suitable for operating 20 passenger devices, a total capacity of the aircraft information system can, by mutually coupling a plurality of such systems, realize a correspondingly larger processing capacity or coupling capacity to passenger devices. Provided for this purpose according to a further embodiment is an aircraft information system comprising a number of the autonomous units which are mutually connected by means of the data communication means.

According to a further preferred embodiment, the means for forming the passenger information comprise means, such as program code means executable on a processing unit, for forming graphically displayable information showing the location of the aircraft on a geographical background, such as a map or a photographic view of the earth's surface. A passenger can hereby receive on an individual basis diverse flight data, including the current status of the flight, such as by watching a film of how the aircraft moves through the landscape.

The aircraft information system more preferably comprises means for showing, in addition to the location of a user's own aircraft, further aircraft from which the receiving means receive respective information. It hereby becomes possible to augment the images of the flight of the aircraft over the landscape with graphic information of other aircraft moving over the landscape. On the basis of information from the ADS-B systems the appearance of the aircraft can be adapted to this information. When the user has a holder suitable for this purpose, the images are adapted for augmented reality display. Provision is made here that the graphic information on the screen is adapted to the direction in which the mobile device is held.

According to a further preferred embodiment, the aircraft information system comprises a server, such as a web server, for handling the communication with the at least one passenger device. The application of the web server provides the option of displaying the information for the passenger in a web browser instead of in a so-called app. This is particularly important precisely when applying the autonomous aircraft information system because, once in an aircraft, the passenger usually no longer has the possibility of downloading a specific app for an aircraft information system from an App Store, which has to be accessed via the internet. Because the necessity of downloading an app from an App Store is obviated, the aircraft information system according to the present invention provides the advantage that all information which can be provided within the possibilities of the web browser and web server can be shown. This relates to showing content to be further referred to below as well as showing the flight information and augmented reality described in the foregoing.

According to a further preferred embodiment, the aircraft information system comprises gateway means for providing a data connection, speech connection and/or internet connection to the passenger device using a data communication system of the aircraft. When the system can connect to a mobile network, such as comprising 3G and 4G, services can be provided at high speed.

When the aircraft information system can connect, such as via the gateway means, to a communication channel via the aircraft, slower services can be provided. The aircraft information system preferably comprises for this purpose adjusting means for adjusting the communication speed to the data connection of the data communication system of the aircraft and/or matching means for matching the communication speed of the data communication system of the aircraft to the passenger device.

According to a further preferred embodiment, the aircraft information system comprises a server for handling payment transactions in communication with the at least one passenger device.

For the purpose of increasing the safety thereof, the aircraft information system is equipped according to a further preferred embodiment with means for determining the temperature of predetermined components, such as the battery, more preferably comprising means for limiting and/or downward adjustment of the power consumption in order to prevent the temperature rising. This prevents components, such as the battery or a processing unit, reaching too high a temperature.

According to a further preferred embodiment, the energy providing means comprise a portable power source, such as a battery or portable generator for electrical energy, or a connector for electrical energy. The system can hereby function wholly autonomously of the aircraft.

The aircraft information system more preferably comprises a sensor arrangement for determining a stage of an aircraft flight, comprising a pressure sensor and an accelerometer. Using the sensor and the accelerometer different stages of the flight are determined by the characteristics of the measurements, such as a stationary presence at the gate, taxiing, take-off, flying at cruise speed, airport approach and landing. This is particularly advantageous because the transmission function of the mobile network module, such as comprising 3G and 4G, can hereby be kept switched off at moments when they ought to be switched off, such as from the moment the take-off procedure begins and such as up to the moment of landing. The system is hereby safe in wholly autonomous manner without intervention by for instance members of a crew.

A further aspect likewise provided in combination with the above stated embodiments relates to the aircraft information system comprising storage means for storing content, such as audiovisual content, in coded manner therein, such as by applying DRM. The system more preferably comprises a web server suitable for displaying coded content, such as audiovisual content in a web browser of a mobile device of a person which is connected by means of a wireless network connection to the aircraft information system so that the coded content from the web server is displayed in the web browser of the mobile device.

It hereby becomes possible in advantageous manner to provide a predetermined amount of content to users of a mobile device connectable to the aircraft information system in a manner not possible heretofore, viz. directly from an aircraft information system to the mobile device of the user via a web server to a web browser connection. It hereby becomes possible to provide the content without an application having to be available on the mobile device. The content can hereby be shown on all mobile devices with a suitable web browser.

Key information is more preferably exchanged here by means of means between the web server and the web browser for the purpose of decrypting the content. The content is more preferably decoded in the mobile device. The key information is more preferably transferred using a Java script. The key information and/or the content information is more preferably stored on a separately encrypted or access-secure partition of a memory of the aircraft information system.

A further aspect according to the present invention relates to a method for identifying, with an aircraft information system, the aircraft in which the aircraft information system is present, comprising steps for:
  receiving ADS information, such as ADS-B, ADS-A and/or ADS-C information,
  determining a signal strength, such as the absolute and/or relative strength of the received ADS information,
  identifying on the basis of this information the aircraft and/or the current flight number of the aircraft in which the aircraft information system is present.

It is possible by applying this aspect of the invention to provide source information which can be further processed to passenger information, this source information relating to the aircraft and the flight number.

Further advantages, features and details of the present invention will be described in greater detail hereinbelow on the basis of one or more preferred embodiments with reference to the accompanying figures. Similar, though not necessarily identical components of different preferred embodiments are designated with the same reference numerals.

DESCRIPTION OF THE INVENTION

Figure 1:
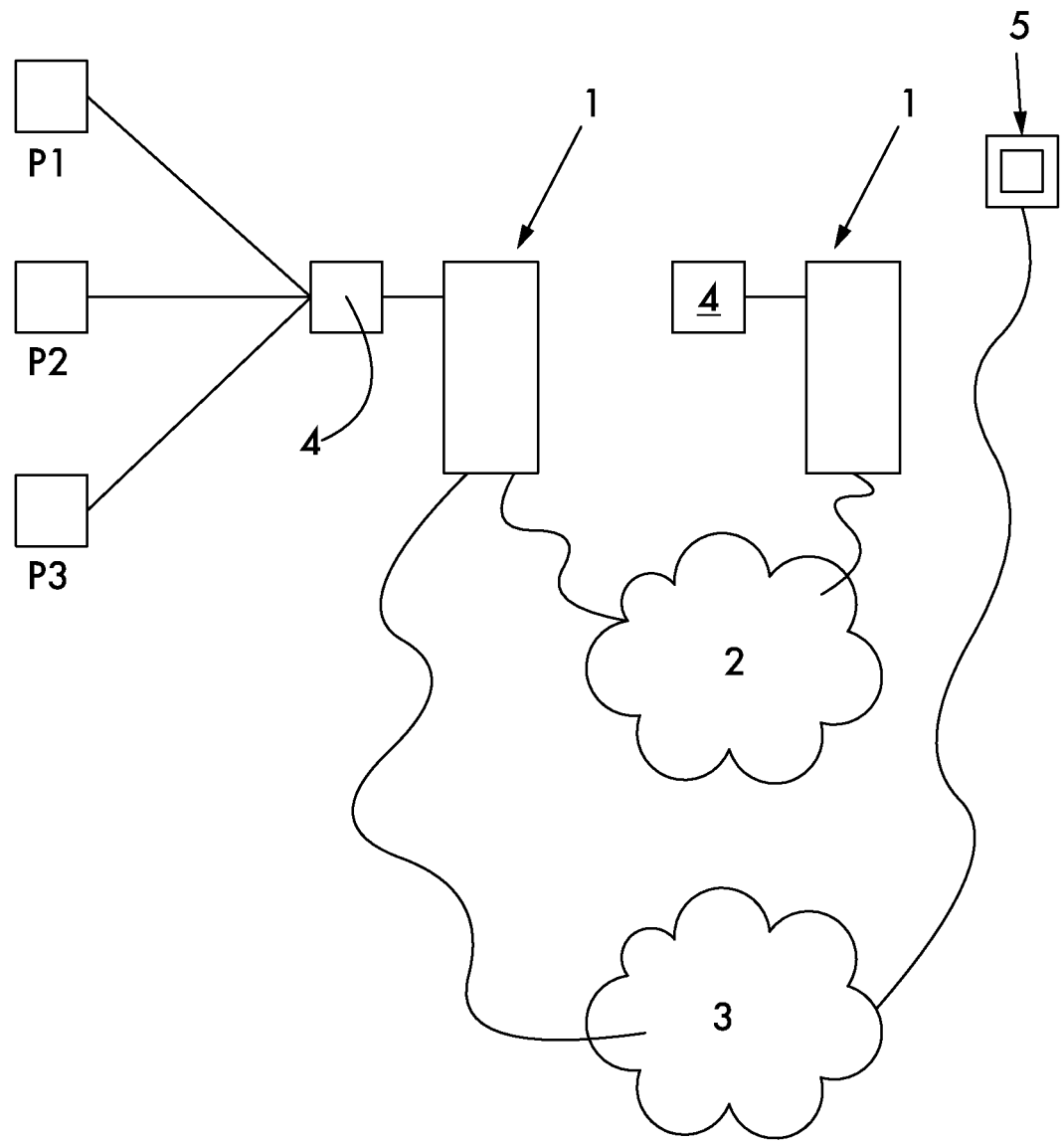
FIG. 1 is a schematic representation of an aircraft information system according to the first preferred embodiment.

A first preferred embodiment (FIG. 1) according to the present invention relates to an aircraft information system 1. This is arranged as module for providing an aircraft information system consisting of a number of such modules 1. Mutual communication between different units of the aircraft information system is performed via a wireless network 2, such as a WiFi network.

Module 1 comprises a receiver 4 for receiving ADS-B signals from aircraft in the vicinity thereof, including the aircraft in which the aircraft information system is located. The aircraft information system is an autonomous module which functions on the basis of its own battery. The modules are therefore freely placeable in any aircraft so that it can function in any aircraft. It is advantageous for this purpose that the module can itself determine in which aircraft it is located. This determination is carried out from the moment the module is switched on.

If different modules are present in the same aircraft, they will set up the network connection 2 between them and mutually exchange relevant information. Provision is made here that information from a first module is transferred to a second module for the purpose of delivering such information to a passenger device. The communication with passenger device 5 is performed via a WiFi network 3. Provision is made that WiFi networks 2 and 3 are separate networks with separate antennas in the modules. Provision is likewise made that WiFi networks 2, 3 are embodied as a physical network. The passenger devices will in this case obtain access rights other than modules 1.

Figure 2:
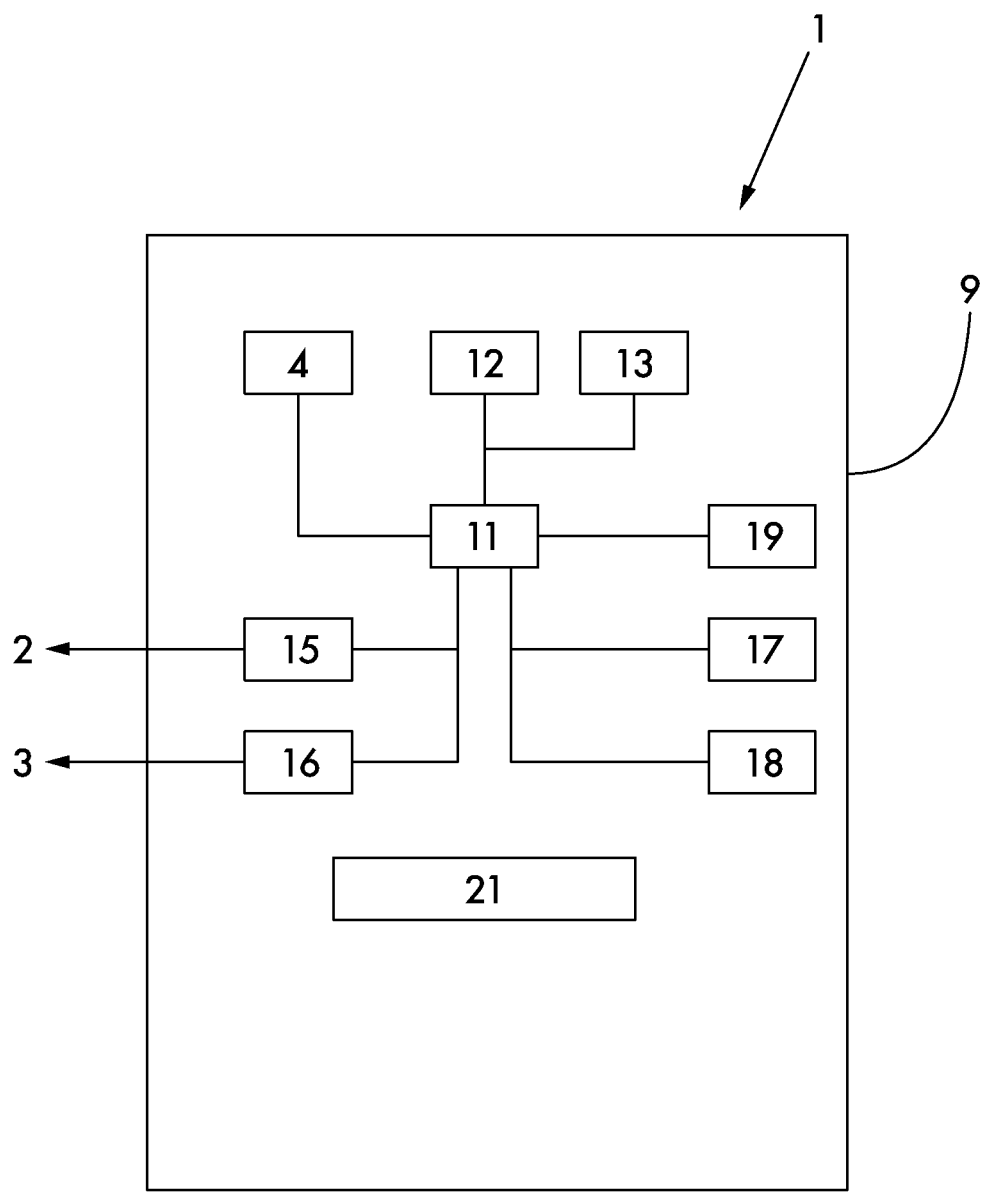
FIG. 2 is a schematic representation of a unit of an aircraft information system as according to FIG. 1.

FIG. 2 shows components of a module in accordance with a preferred embodiment according to the present invention. The module is provided with energy by means of battery 21. A processing unit is connected to a working memory 12 and a storage memory, such as a disc memory, 13. The ADS-B receiver 4 provides the processing unit with data relating to received ADS-B signals which can be temporarily stored in working memory 12 or on disc memories 13.

Provided for communication with external data sources is a GSM module, such as also suitable for 3G, 4G. In the case it is not firmly established that the aircraft is present on the ground, or has landed and has not yet taken off, the transmission option of the GSM module is switched off and is set only to receive.

The module further comprises a sensor 17 for measuring the air pressure, and a sensor for measuring movement. Applying such sensors and for instance the presence of GSM signals, a determination is made as to whether the aircraft is present on the ground, and has thus landed and not yet taken off. The transmission option of the GSM module is controlled as described on the basis hereof.

The module also comprises a WiFi module 15 for communication with network 2 for mutual communication between two or more aircraft information systems in the same aircraft, and a WiFi module 16 for communication with network 3 for transferring information to the passengers.

As aspect, the invention comprises an aircraft information system for providing passenger information, such as flight information or entertainment information, to the passengers in an aircraft by making use of communication between at least one passenger device and the aircraft information system, the aircraft information system comprising storage means for storing information thereon, one or more processing units for carrying out information processing, energy providing means for providing energy to the aircraft information system, data communication means, such as wireless communication means, for communication with the at least one passenger device, wherein the aircraft information system is configured as autonomous unit for autonomous functioning, such as independently of further systems in the aircraft, and wherein the aircraft information system comprises sensors for detecting ambient variables, for providing measurement data such as movement by means of an accelerometer, air pressure by means of a pressure sensor, preferably for measuring an absolute air pressure, more preferably for measuring changes in air pressure, preferably combinable with any individual measure in accordance with this description. A transceiver for making a connection to a network operational in the aircraft, preferably a network system for cabin systems, such as ARINC bus or an ARINC 429, is more preferably provided.

The present invention has been described in the foregoing on the basis of several preferred embodiments. Different aspects of different embodiments are deemed described in combination with each other, wherein all combinations which can be deemed by a skilled person in the field as falling within the scope of the invention on the basis of reading of this document are included. These preferred embodiments are not limitative for the scope of protection of this document. The rights sought are defined in the appended claims.

The invention claimed is:

1. An aircraft information system for providing passenger information to the passengers in an aircraft by making use of communication between at least one passenger device and the aircraft information system, the aircraft information system comprising:
   storage means for storing information thereon,
   one or more processing units for performing information processing,
   energy providing means for providing energy to the aircraft information system,
   data communication means for communication with the at least one passenger device,
   wherein the aircraft information system is configured as an autonomous unit for autonomous functioning, and wherein the aircraft information system further comprises:
   receiving means for receiving source information relating to the aircraft for forming on the basis of the source information respective passenger information for transmission to the at least one passenger device,
   means for determining a temperature of predetermined components, and means for limiting and/or downward adjustment of power consumption in order to prevent the temperature rising.

2. The aircraft information system as claimed in claim 1, wherein the receiving means are configured to receive ADS signals.

3. The aircraft information system as claimed in claim 2, comprising means for determining which ADS signals are related to the aircraft.

4. The aircraft information system as claimed in claim 1, comprising sensors for detecting ambient variables and for providing measurement data.

5. The aircraft information system as claimed in claim 1, comprising a receiver for mobile telecommunication.

6. The aircraft information system as claimed in claim 1, comprising means for determining the presence of the aircraft on the ground.

7. The aircraft information system as claimed in claim 1, wherein the system is housed in a holder.

8. The aircraft information system as claimed in claim 1, wherein the system is formed by a number of the autonomous units which are mutually connected by means of the data communication means.

9. The aircraft information system as claimed in claim 1, wherein the means for forming the passenger information comprise means for forming graphically displayable information showing the location of the aircraft on a geographical background.

10. The aircraft information system as claimed in claim 9, comprising means for showing, in addition to the location of a user's own aircraft, further aircraft from which the receiving means receive respective information.

11. The aircraft information system as claimed in claim 1, comprising a server for handling the communication with the at least one passenger device.

12. The aircraft information system as claimed in claim 1, comprising gateway means for providing a data connection, speech connection and/or internet connection to the passenger device using a data communication system of the aircraft.

13. The aircraft information system as claimed in claim 12, comprising adjusting means for adjusting a communication speed to the data connection of the data communication system of the aircraft.

14. The aircraft information system as claimed in claim 12, comprising matching means for matching a communication speed of the data communication system of the aircraft to the passenger device.

15. The aircraft information system as claimed in claim 1, comprising a server for handling payment transactions in communication with the at least one passenger device.

16. The aircraft information system as claimed in claim 1, wherein the energy providing means comprise a portable power source or a connector for electrical energy.

17. The aircraft information system as claimed in claim 1, comprising a sensor arrangement for determining a stage of an aircraft flight, comprising a pressure sensor and an accelerometer.

18. The aircraft information system as claimed in claim 1, comprising storage means for storing content in coded manner therein.

19. An aircraft information system which functions autonomously in an aircraft, comprising a web server suitable for storing and displaying coded content in a web browser of a mobile device of a person which is connected by means of a wireless network connection to the aircraft information system so that the coded content stored at the web server is downloaded directly into the web browser of the mobile device and displayed in the web browser of the mobile device, wherein key information is exchanged directly between the web server and the web browser for the purpose of decrypting the content.

20. The aircraft information system as claimed in claim 19, wherein the content is decoded in the mobile device.

21. The aircraft information system as claimed in claim 19, wherein the key information is transferred using a Java script.

22. The aircraft information system as claimed in claim 19, wherein the key information is stored on a separately encrypted or access-secure partition of a memory of the aircraft information system.

23. A method for identifying, with an aircraft information system, an aircraft in which the aircraft information system is present, the method comprising:
   receiving, by the aircraft information system, automatic dependent surveillance (ADS) information,
   determining, by the aircraft information system, a signal strength of the received ADS information, and
   identifying, by the aircraft information system, on the basis of the signal strength and the received ADS information the aircraft and/or a current flight number of the aircraft in which the aircraft information system is present for presentation of information relating to the aircraft and/or the current flight number of the aircraft to a passenger.

24. The method as claimed in claim 23, wherein the step for determining the signal strength comprises steps for determining from which aircraft signal the relatively largest number of data packets has been received.

25. The method as claimed in claim 23, wherein the step for determining the signal strength comprises steps for determining the strength of a radio signal.

26. The method as claimed in claim 23, comprising steps for determining predetermined aircraft parameters, air pressure parameters and/or functional availability of mobile telecommunication signals for use thereof in the steps for identifying the aircraft and/or the current flight number.

* * * * *